(12) United States Patent
Weng et al.

(10) Patent No.: US 8,366,487 B2
(45) Date of Patent: Feb. 5, 2013

(54) ELECTRONIC DEVICE HAVING ADAPTER

(75) Inventors: Cheng-Fei Weng, Shenzhen (CN); Zheng-Heng Sun, New Taipei (TW)

(73) Assignees: Hong Fu Jin Precision Industry (ShenZhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 38 days.

(21) Appl. No.: 13/215,242

(22) Filed: Aug. 23, 2011

(65) Prior Publication Data

US 2012/0162900 A1 Jun. 28, 2012

(30) Foreign Application Priority Data

Dec. 24, 2010 (CN) .......................... 2010 1 0606760

(51) Int. Cl.
*H01R 13/66* (2006.01)
(52) U.S. Cl. .................................................. 439/620.01
(58) Field of Classification Search .............. 439/620.1, 439/620.2, 620.22, 638; 361/752, 753
See application file for complete search history.

(56) References Cited

U.S. PATENT DOCUMENTS

| | | | | |
|---|---|---|---|---|
| 5,243,510 A | * | 9/1993 | Cheney, II | 363/146 |
| 5,827,092 A | * | 10/1998 | Minich | 439/620.1 |
| 5,975,958 A | * | 11/1999 | Weidler | 439/620.22 |
| 6,062,910 A | * | 5/2000 | Braquet et al. | 439/620.03 |
| 2004/0070369 A1 | * | 4/2004 | Sakakibara | 320/128 |
| 2009/0079264 A1 | * | 3/2009 | Minami | 307/44 |
| 2012/0268888 A1 | * | 10/2012 | Tian et al. | 361/679.33 |

* cited by examiner

*Primary Examiner* — Phuong Dinh
(74) *Attorney, Agent, or Firm* — Altis Law Group, Inc.

(57) ABSTRACT

An exemplary server includes a housing, a printed circuit board disposed in the housing, a power supply received in the housing, a hard disk drive assembly fixed in the housing and a connection device connected to the hard disk drive. The connection device includes a connector connected to the hard disk drive, an adapter connected to the hard disk drive, a power transferring line connecting the adapter to the power supply, and a data transferring line connecting the connector to the printed circuit board. The adapter has output pins and input pins for transferring power from the power supply to the hard disk drive. Capacitors and resistors are connected between the input pins and the output pins.

20 Claims, 5 Drawing Sheets

ELECTRONIC DEVICE HAVING ADAPTER

BACKGROUND

1. Technical Field

The present disclosure relates to electronic devices, and more particularly, to an electronic device having an adapter.

2. Description of Related Art

Hard disk drives are widely used in servers for data storage. Generally, if a hard disk drive is required to be inserted into or pulled out from a server, the server should be shut down firstly to prevent the hard disk drive from being damaged. Then after such shutdown, the hard disk drive is inserted into or pulled from the server. When this method is used to exchange the hard disk drive for another one, the method is called a cold-swap method. The reasons for using the cold-swap method are, firstly, that at the moment when the hard disk drive is pulled from the server, the magnetic head of the hard disk drive cannot be timely returned to its original position due to the power supply being suddenly cut off. This causes malfunction of the hard disk drive. In addition, at the moment when the replacement hard disk drive is inserted into the server, an instant current pulse is produced and may cause damage to the electronic elements of the hard disk drive.

However, since the server often needs to work continuously in order to maintain data exchange with other electronic devices, shutting down the server is undesirable.

What is needed, therefore, is an electronic device which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
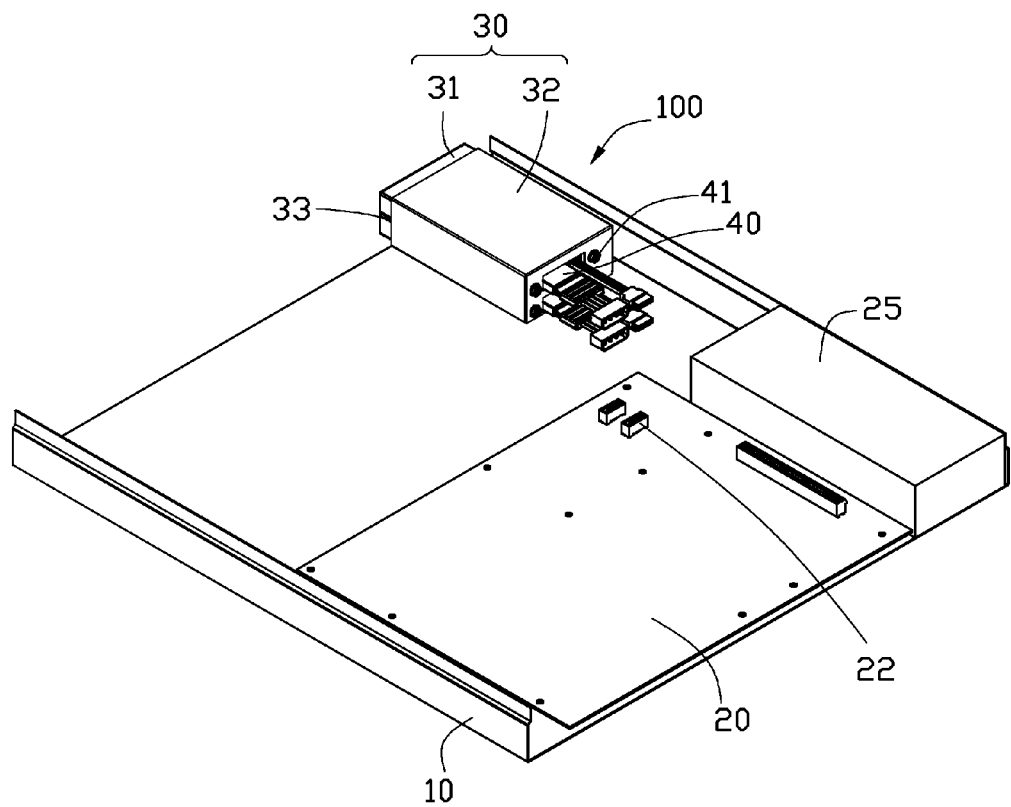
FIG. 1 is an isometric view of a part of a server of an embodiment of the present disclosure.

Referring to FIG. 1, a part of a server 100 in accordance with an embodiment of the present disclosure is shown. The server 100 includes a housing 10, a printed circuit board 20 mounted within the housing 10, a hard disk drive assembly 30 fixed on the housing 10, two connection devices 40 connected to the hard disk drive assembly 30, and a power supply 25 secured on the housing 10 adjacent to the printed circuit board 20.

The housing 10 is made of metal for providing protection for an electronic device received therein. The printed circuit board 20 has a plurality of data sockets 22 mounted on a top face thereof. The power supply 25 is juxtaposed with the printed circuit board 20 and aligned with the hard disk drive assembly 30. The hard disk drive assembly 30 includes a shell 32, and two hard disk drives 31 received in the shell 32. The shell 32 has an opening 33 defined in a front side thereof for facilitating assembly of the hard disk drives 31 into the shell 32. The hard disk drives 31 are SATA (Serial Advanced Technology Attachment) hard disk drives. The two hard disk drives 31 are connected to the two connection devices 40, respectively.

Figure 2:
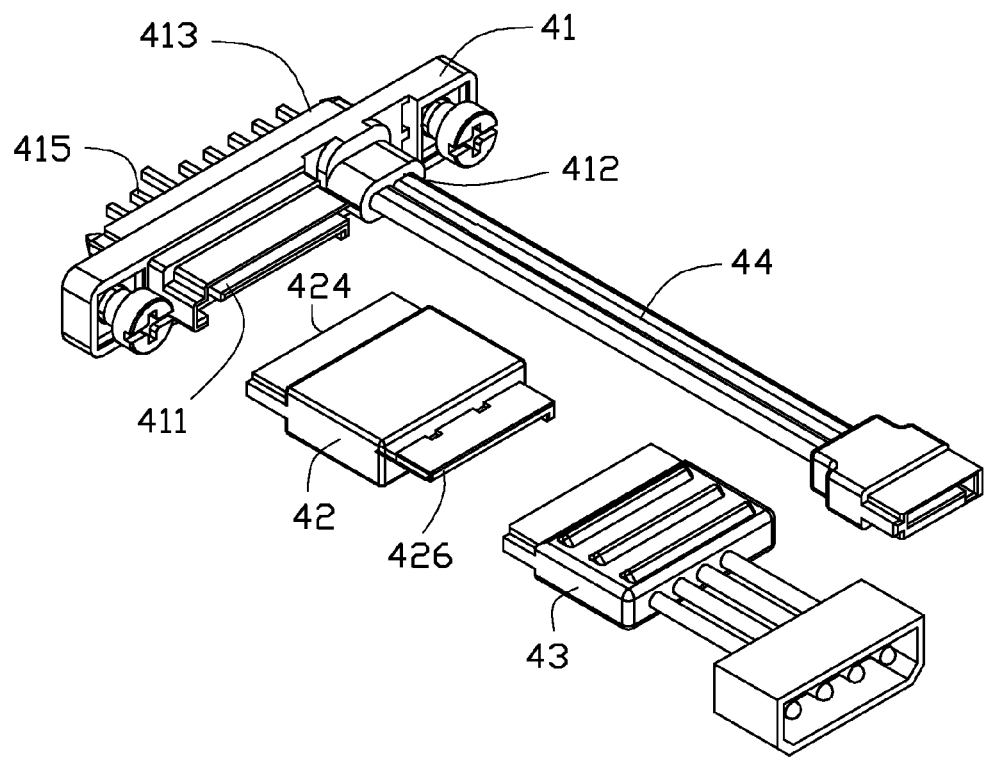
FIG. 2 is an enlarged, exploded view of a connection device of the part of the server of FIG. 1.

Also referring to FIG. 2, each connection device 40 includes a cold-swappable connector 41, an adapter 42, a power transferring line 43, and a data transferring line 44. The connector 41 includes a connection port 413 for connection with the corresponding hard disk drive 31 in a front side thereof, and a power port 411 and a data port 412 in a back side thereof. The connector 41 has fifteen terminals 415 each having two opposite ends protruding out of the front and back sides of the connector 41. A terminal 3 and a terminal 9 (the longest one shown in FIG. 2 is one of terminals 3 and 9) have lengths greater than a length of the other terminals 415.

Figure 3:
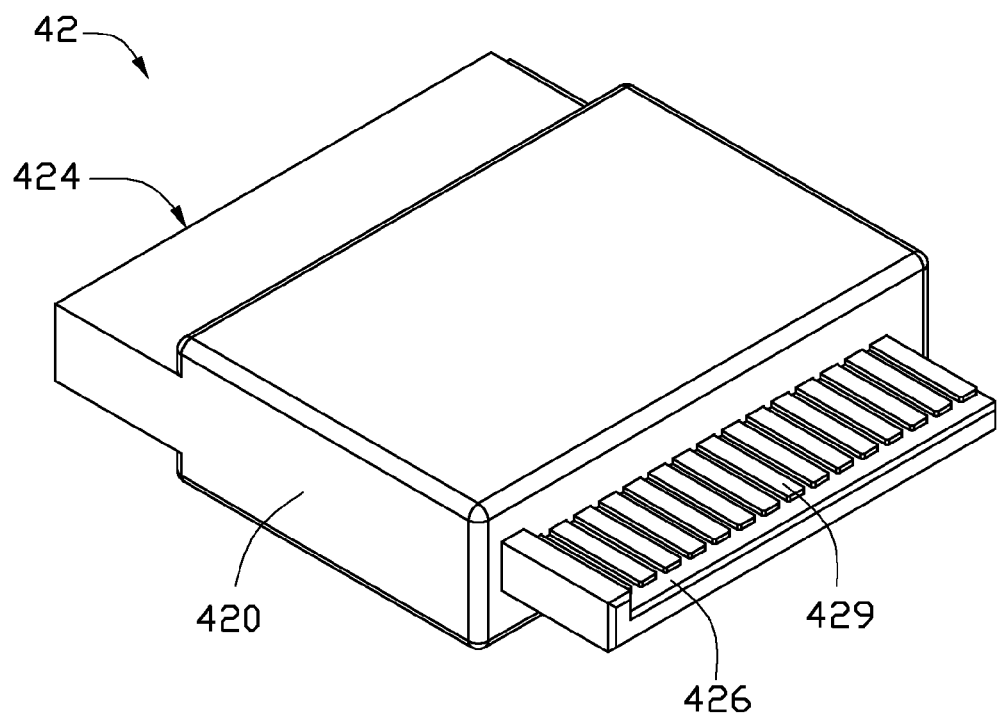
FIG. 3 is an isometric view of an adapter of the connection device of FIG. 2, showing the adapter inverted.
Figure 4:
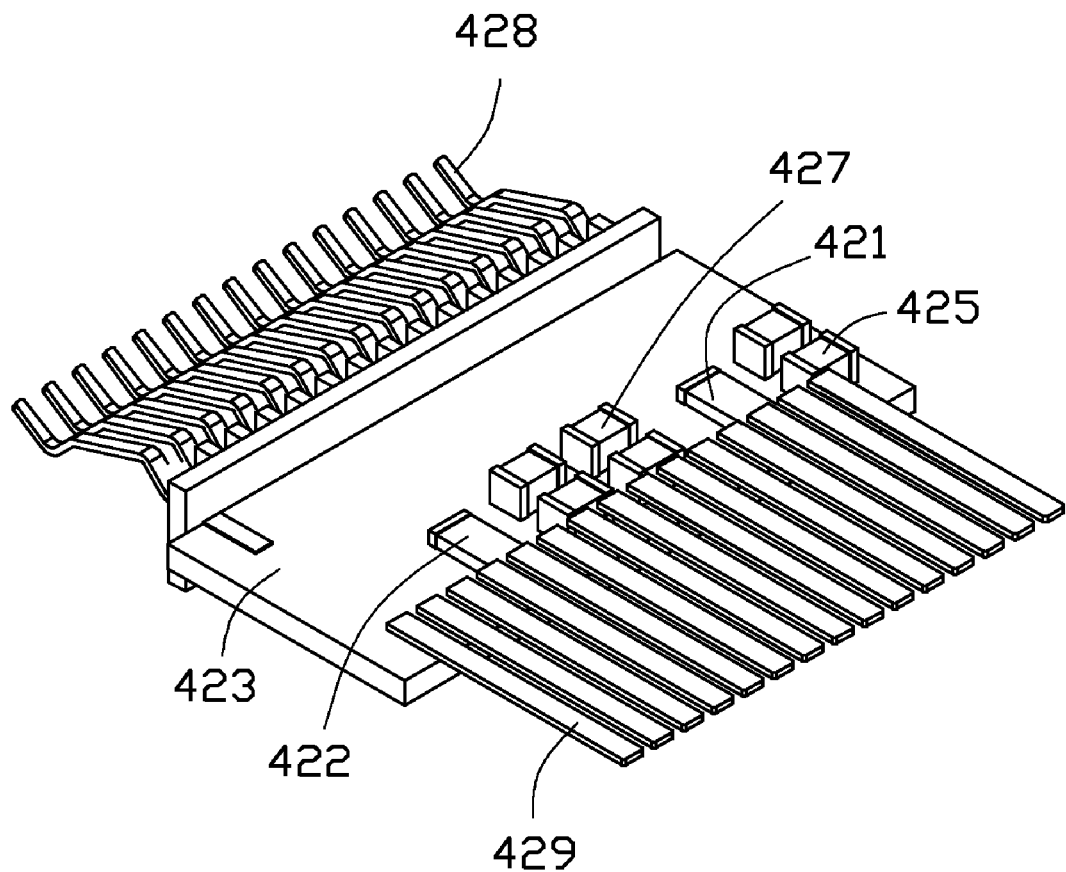
FIG. 4 shows an inner structure of the adapter of FIG. 3.

Referring to FIGS. 3-4 also, the adapter 42 includes an enclosure 420 and a plate 423 received in the enclosure 420. The adapter 42 defines a first port 424 for coupling with the power port 411 of the connector 41, and a second port 426 for coupling with the power line 43. A plurality of resistors 421, 422, capacitors 425, 427, and output pins 428 and input pins 429 are attached on the plate 423. In this embodiment, there are fifteen output pins 428 protruding outwardly from a front side of the plate 423 and exposed within the first port 424, and there are fifteen input pins 429 protruding outwardly from a back side of the plate 423 and exposed within the second port 426. The resistors 421, 422 include a first resistor 421 and a second resistor 422, and the capacitors 425, 427 include two first capacitors 425 and four second capacitors 427.

Figure 5:
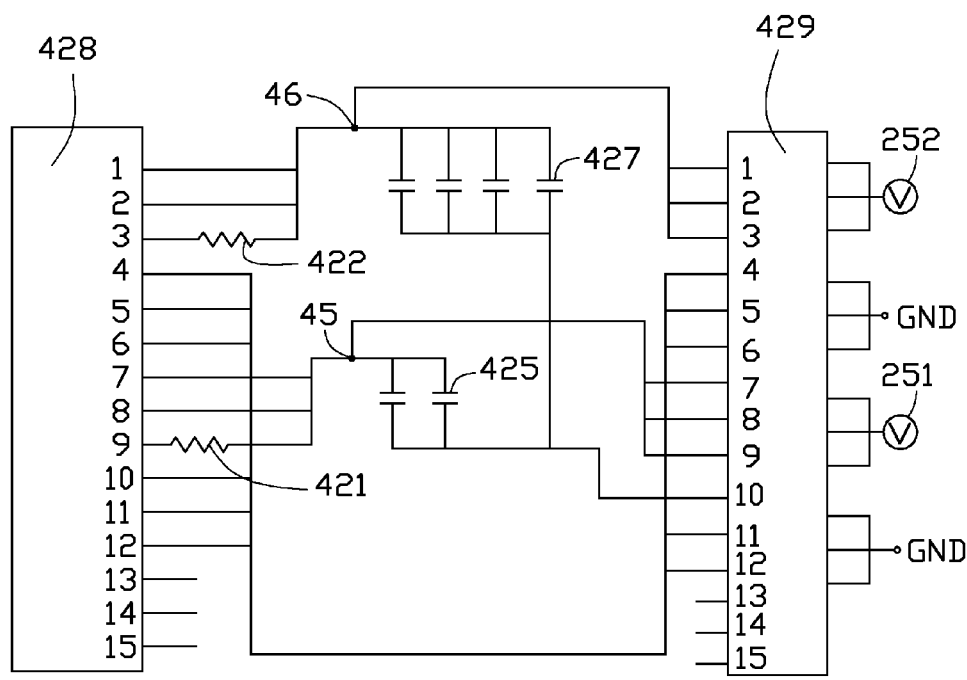
FIG. 5 is a circuit diagram of the structure of the adapter of FIG. 4.

Also referring to FIG. 5, the output pins 428 and the input pins 429 each have pin 1, pin 2, and pin 3 acting as second power terminals, pin 7, pin 8, and pin 9 acting as first power terminals, pin 4, pin 5, pin 6, pin 10, pin 11, and pin 12 acting as grounded terminals, and pin 13, pin 14, and pin 15 acting as free terminals. The first capacitors 425 are connected in parallel with each other, wherein adjacent ends of the first capacitors 425 are coupled with each other to form a first node 45, and the other adjacent ends of the first capacitors 425 are coupled with the grounded terminals. The second capacitors 427 are also connected in parallel with each other, wherein adjacent ends of the second capacitors 427 are coupled with each other to form a second node 46, and the other adjacent ends of the second capacitors 427 are coupled with the grounded terminals.

The first resistor 421 is connected between pin 9 of the output pins 428 and the first node 45, and the second resistor 422 is connected between pin 3 of the output pins 428 and the second node 46. Pin 7 and pin 8 of the output pins 428 and pin 7, pin 8, and pin 9 of the input pins 429 are directly coupled with the first node 45. Pin 1 and pin 2 of the output pins 428 and pin 1, pin 2, and pin 3 of the input pins 429 are directly coupled with the second node 46.

When the second port 426 of the adapter 42 is connected to the power supply 25 through the power transferring line 43, the first power terminals of the input pins 429 are electrically connected to a first power source 251 of the power supply 25, and the second power terminals of the input pins 429 are electrically connected to a second power source 252 of the power supply 25. In this embodiment, the first power source 251 can provide a voltage of 5 V (volts), and the second power source 252 can provide a voltage of 12 V.

In assembly, the first port 424 of the adapter 42 is coupled with the power port 411 of the connector 41, the power transferring line 43 is connected between the second port 426 of the adapter 42 and the power supply 25, and the data transferring line 44 is connected between the data port 412 of the connector 41 and the socket 22 of the printed circuit board 20. The output pins 428 of the adapter 42 are connected to the terminals 415 of the connector 41, respectively, wherein pin 9 and pin 3 of the output pins 428 are connected to terminal 3 and terminal 9 of the terminals 415, respectively.

When a hard disk drive 31 is inserted into the shell 32 to connect a corresponding connector 41 during operation of the server 100, the longest terminals (i.e., terminal 3 and terminal 9) of the connector 41 are electrically connected to the hard disk drive 31 prior to the other terminals 415, to thereby cause pin 3 and pin 9 of the input pins 429 to electrically connect the power supply 25 firstly. Since the hard disk drive 31 generally has a working voltage of either 5 V or 12 V, a controlling element of the hard disk drive 31 can automatically select the right voltage from one of terminal 9 and terminal 3, which are connected to the first power source 251 of 5 V and the second power source 252 of 12 V, respectively. For example, if the working voltage of the hard disk drive 31 is 5 V, terminal 9 of the input pins 429 is electrically connected to the first power source 251 of the power supply 25 to supply power for the hard disk drive 31.

When the hard disk drive 31 is further inserted into the shell 32 to fully connect with the connector 41, the other terminals 415 of the connector 41 are electrically connected to the hard disk drive 31, and the hard disk drive 31 is supplied with a full working voltage to operate normally. Since there is a time interval between when terminal 3 and terminal 9 are connected to the hard disk drive 31 and when the other terminals 415 of the connector 41 are connected to the hard disk drive 31, a start time of the hard disk drive 31 is delayed. At the time when the hard disk drive 31 is powered by the power supply 25, the first capacitors 425 and/or the second capacitors 427 are also charged by the power supply 25 for preventing damage to the hard disk drive 31 which may be caused by an instant current pulse being generated at the moment when the hard disk drive 31 is inserted into the connector 41. Moreover, the first resistor 421 and/or the second resistor 424 can also lower the impact of the instant current pulse on the hard disk drive 31, thereby further protecting the hard disk drive 31.

When the hard disk drive 31 is pulled out from the shell 32 while the server 100 is in operation, the other terminals 415 of the connector 41 are disconnected from the hard disk drive 31 prior to terminal 3 and terminal 9. The controlling element of the hard disk drive 31 detects the variation of the voltage and accordingly sends a signal to cause the magnetic head of the hard disk drive 31 to stop working and return to its original position. Meanwhile, the first capacitors 425 and/or the second capacitors 427, which have been charged during operation of the hard disk drive 31, discharge their power to the hard disk drive 31 for maintaining operation of the hard disk drive 31 for a short while, thereby facilitating the return of the magnetic head to its original position.

Using the adapter 42, the cold-swappable connector 41 is upgraded to a hot-swappable connector 41, whereby the hard disk drive 31 can be inserted into or pulled out from the server 100 even when the server 100 is in operation. Continuous operation of the server 100 is thus ensured.

It is believed that the present embodiments will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An electronic device comprising:
   a hard disk drive;
   a connector connected with the hard disk drive;
   a power supply; and
   an adapter connecting the connector with the power supply, the adapter comprising a plurality of output pins electrically connected to the connector, a plurality of input pins electrically connected to the power supply, and a first capacitor electrically connecting a first one of the input pins with a first one of the output pins;
   wherein when the hard disk drive is inserted into the connector, the first capacitor is charged to reduce an instant current pulse from the power supply to the hard disk drive; and
   wherein when the hard disk drive is pulled out from the connector, the first capacitor is discharged to maintain operation of the hard disk drive for a period of time.

2. The electronic device of claim 1, wherein the first output pin is a power terminal for inputting power from the power supply to the hard disk drive.

3. The electronic device of claim 2, wherein the input pins further comprise a second input pin connected to a first power source of the power supply and acting as a power terminal, wherein the second input pin is electrically connected to the first capacitor via a first node.

4. The electronic device of claim 3, wherein the first output pin is electrically connected to the first node through a first resistor.

5. The electronic device of claim 3, wherein the first input pin is a grounded terminal.

6. The electronic device of claim 3, further comprising another first capacitor connected between the first input pin and the first output pin, the another first capacitor being connected in parallel with the first capacitor.

7. The electronic device of claim 3, wherein the input pins further comprise a third input pin connected to a second power source of the power supply and acting as a power terminal, and the output pins further comprise a second output pin acting as a power terminal electrically connected to the third input pin.

8. The electronic device of claim 7, further comprising a second capacitor electrically connected to the third input pin via a second node.

9. The electronic device of claim 8, further comprising a second resistor connected between the second output pin and the second node.

10. The electronic device of claim 9, wherein the second capacitor is also electrically connected to the first input pin.

11. The electronic device of claim 10, further comprising another second capacitor electrically connected between the second node and the first input pin, the another second capacitor being connected in parallel with the second capacitor.

12. The electronic device of claim 7, wherein the first power source has a voltage different from that of the second power source.

13. The electronic device of claim 7, wherein the connector comprises a plurality of terminals, the terminals of the connector comprising a first terminal and a second terminal to connect the first output pin and the second output pin, respectively, the first terminal and the second terminal having lengths greater than a length of the other terminals of the connector so that the first output pin and the second output pin are electrically connected to the hard disk drive prior to the other output pins during a process of connecting the hard disk drive to the connector.

14. The electronic device of claim 7, wherein the output pins further comprise a third output pin and a fourth output pin acting as grounded terminals, the third output pin and the fourth output pin being electrically connected to the first input pin.

15. The electronic device of claim 14, wherein the third output pin is located between the first output pin and the second output pin, and the first output pin is located between the third output pin and the fourth output pin.

16. The electronic device of claim 14, wherein the input pins further comprise a fourth input pin acting as a grounded terminal, the fourth input pin being electrically connected to the first input pin, the third output pin and the fourth output pin.

17. The electronic device of claim 16, wherein the fourth input pin is located between the second input pin and the third input pin, and the second input pin is located between the fourth input pin and the first input pin.

18. The electronic device of claim 16, wherein the input pins further comprise a fifth input pin acting as a free pin, and the output pins further comprise a fifth output pin acting as a free pin.

19. The electronic device of claim 1, wherein the adapter is electrically connected to the power supply through a power transferring line.

20. The electronic device of claim 1, wherein the electronic device is a server.

* * * * *